US012803017B2

(12) United States Patent
Kim et al.

(10) Patent No.: US 12,803,017 B2
(45) Date of Patent: Nov. 17, 2026

(54) GASKET ASSEMBLY AND FUEL CELL MEMBRANE HUMIDIFIER COMPRISING SAME

(71) Applicant: KOLON INDUSTRIES, INC., Seoul (KR)

(72) Inventors: Do Woo Kim, Seoul (KR); Kyoung Ju Kim, Seoul (KR); Na Hyun Ahn, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 600 days.

(21) Appl. No.: 18/261,141

(22) PCT Filed: Jan. 24, 2022

(86) PCT No.: PCT/KR2022/001197
§ 371 (c)(1),
(2) Date: Jul. 12, 2023

(87) PCT Pub. No.: WO2022/169151
PCT Pub. Date: Aug. 11, 2022

(65) Prior Publication Data
US 2024/0322197 A1 Sep. 26, 2024

(30) Foreign Application Priority Data
Feb. 4, 2021 (KR) ........................ 10-2021-0016021

(51) Int. Cl.
*H01M 8/04119* (2016.01)
*B01D 63/02* (2006.01)

(52) U.S. Cl.
CPC ........ *H01M 8/04149* (2013.01); *B01D 63/02* (2013.01); *B01D 2313/041* (2022.08);
(Continued)

(58) Field of Classification Search
CPC ................................................ H01M 8/04149
See application file for complete search history.

(56) References Cited

U.S. PATENT DOCUMENTS 4,480,683 A 11/1984 Wollbeck et al.
2021/0057767 A1* 2/2021 Kim .................... B01D 63/024
(Continued)

FOREIGN PATENT DOCUMENTS

EP 0 058 275 A1 8/1982
EP 1 616 617 A1 1/2006
(Continued)

OTHER PUBLICATIONS

KR OA dated May 22, 2024.
(Continued)

*Primary Examiner* — Sathavaram I Reddy
(74) *Attorney, Agent, or Firm* — Harvest IP Law, LLP

(57) ABSTRACT

The present invention relates to a gasket assembly that can be manufactured with improved productivity and significantly reduce maintenance costs, and to a fuel cell membrane humidifier comprising same. A gasket assembly according to an embodiment of the present invention is a gasket assembly for a fuel cell membrane humidifier comprising a mid-case, a cap fastened to the mid-case, and at least one cartridge disposed in the mid-case and accommodating a plurality of hollow fiber membranes, and comprises: a sub-case formed in a shape surrounding an end of the cartridge and having a first hole into which the end of the cartridge is inserted; and a gasket including a body member having a second hole into which the sub-case is inserted, a packing part formed at one end of the body member and including a protruding member in contact with the outer circumferential surface of the sub-case inserted into the second hole to prevent a fluid in the mid-case from flowing toward the cap, and an edge part formed at the other end of
(Continued)

the body member and formed in a space formed by a groove formed at the end of the mid-case and the end of the cap.

7 Claims, 6 Drawing Sheets

(52) U.S. Cl.
CPC .... *B01D 2313/13* (2013.01); *B01D 2313/201* (2022.08); *B01D 2313/21* (2013.01); *B01D 2313/44* (2013.01)

(56) References Cited

U.S. PATENT DOCUMENTS

| | | | |
|---|---|---|---|
| 2022/0123334 | A1 | 4/2022 | Kim et al. |
| 2022/0255092 | A1 | 8/2022 | Kim et al. |

FOREIGN PATENT DOCUMENTS

| | | | |
|---|---|---|---|
| EP | 2 798 691 | B1 | 11/2018 |
| EP | 3 734 731 | A1 | 4/2020 |
| JP | 2011141082 | A | 7/2011 |
| JP | 5825032 | B2 | 12/2015 |
| KR | 20090013304 | A | 2/2009 |
| KR | 20090057773 | A | 6/2009 |
| KR | 20090128005 | A | 12/2009 |
| KR | 20100108092 | A | 10/2010 |
| KR | 20100131631 | A | 12/2010 |
| KR | 20110001022 | A | 1/2011 |
| KR | 20110006122 | A | 1/2011 |
| KR | 20110006128 | A | 1/2011 |
| KR | 20110021217 | A | 3/2011 |
| KR | 20110026696 | A | 3/2011 |
| KR | 20110063366 | A | 6/2011 |
| KR | 101251256 | B1 | 4/2013 |
| KR | 10-2016-0004278 | A | 1/2016 |
| KR | 20190081736 | A | 7/2019 |
| KR | 10-2019-0138529 | A | 12/2019 |
| KR | 20190138528 | A | 12/2019 |
| KR | 20190138529 | A | 12/2019 |
| KR | 102137257 | B1 | 7/2020 |
| KR | 10-2020-0122260 | A | 10/2020 |
| KR | 20200122260 | A | 10/2020 |
| KR | 10-2021-0000679 | A | 1/2021 |
| KR | 10-2021-0000680 | A | 1/2021 |
| WO | 92/12787 | | 8/1992 |
| WO | 2019/132141 | A1 | 7/2019 |
| WO | 2020/022506 | A1 | 1/2020 |
| WO | 2020/213990 | A1 | 10/2020 |
| WO | 2021/107668 | A1 | 6/2021 |

OTHER PUBLICATIONS

JP OA dated Jun. 14, 2024.
European search report dated Sep. 2, 2024 for a corresponding EP application.

* cited by examiner

GASKET ASSEMBLY AND FUEL CELL MEMBRANE HUMIDIFIER COMPRISING SAME

CROSS REFERENCE TO RELATED APPLICATION

This application is a National Stage filing under 35 U.S.C. 371 of International Application No. PCT/KR2022/001197 filed on Jan. 24, 2022 and claims priority to Korean Patent Application No. 10-2021-0016021 filed on Feb. 4, 2021, the disclosures of which is incorporated herein by reference in its entirety.

TECHNICAL FIELD

The present invention relates to a gasket assembly and a fuel cell membrane humidifier including the same, and more specifically, to a gasket assembly that can be manufactured with improved productivity and greatly reduces a maintenance cost, and a fuel cell membrane humidifier including the same.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a humidifier can be reduced.

A selective permeable membrane used in the membrane humidification scheme is preferably a hollow fiber membrane having a large permeable area per unit volume when a module is formed. That is, when a humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an off-gas discharged with a high temperature from the fuel cell can be recovered and can be reused through the humidifier.

FIG. 1 is an exploded perspective view illustrating a fuel cell membrane humidifier according to the related art. As illustrated in FIG. 1, the fuel cell membrane humidifier 10 of the related art includes a humidification module 11 in which moisture exchange between air supplied from the outside and an off-gas discharged from a fuel cell stack (not illustrated) occurs, and caps 12 coupled to both ends of the humidification module 11.

One of the caps 12 supplies the air supplied from the outside to the humidification module 11, and the other supplies air humidified by the humidification module 11 to the fuel cell stack.

The humidification module 11 includes a mid-case 11*a* having an off-gas inlet 11*aa* and an off-gas outlet 11*ab*, and a plurality of hollow fiber membranes 11*b* in the mid-case 11*a*. Both ends of a bundle of hollow fiber membranes 11*b* are fixed to potting portions 11*c*. The potting portions 11*c* are generally formed by curing a liquid polymer such as a liquid polyurethane resin through a casting scheme.

The air supplied from the outside flows along hollows of the hollow fiber membranes 11*b*. The off-gas flowing into the mid-case 11*a* through the off-gas inlet 11*aa* comes into contact with outer surfaces of the hollow fiber membranes 11*b*, and then, is discharged from the mid-case 11*a* through the off-gas outlet 11*ab*. When the off-gas comes into contact with the outer surfaces of the hollow fiber membranes 11*b*, moisture contained in the off-gas permeates the hollow fiber membranes 11*b* to humidify the gas flowing along the hollows of the hollow fiber membranes 11*b*.

Inner spaces of the caps 12 are in fluid communication only with the hollows of the hollow fiber membranes 11*b*, and should be completely blocked from an inner space of the mid-case 11*a*. Otherwise, air leakage occurs due to a pressure difference, an amount of humidified air supplied to the fuel cell stack is reduced, and efficiency of power generation of the fuel cell is degraded.

In general, as illustrated in FIG. 1, the potting portion 11*c* to which ends of the plurality of hollow fiber membranes 11*b* are fixed, and a resin layer 11*d* between the potting portion 11*c* and the mid-case 11*a* block the inner spaces of the caps 12 and the inner space of the mid-case 11*a*. The resin layer

11*d* is generally formed by curing a liquid polymer such as liquid polyurethane resin through a casting scheme, similar to the potting portion 11*c*.

However, since a casting process for forming the resin layer 11*d* requires a relatively long process time, the productivity of the membrane humidifier 10 is degraded.

Further, since the resin layer 11*d* is adhered to an inner wall of the mid-case 11*a* as well as the potting portion 11*c*, the entire humidification module 11 should be replaced when a problem occurs in the hollow fiber membranes 11*b*, which incurs a huge maintenance cost.

Further, a repetitive operation of the fuel cell is highly likely to cause a gap between the resin layer 11*d* and the mid-case 11*a*. That is, as an operation and stop of the fuel cell are repeated, expansion and contraction of the resin layer 11*d* alternately occur, and a difference in thermal expansion coefficient between the mid-case 11*a* and the resin layer 11*d* is highly likely to cause separation of the resin layer 11*d* from the mid-case 11*a*. As described above, when the gap is caused between the resin layer 11*d* and the mid-case 11*a*, air leakage occurs due to a pressure difference, an amount of humidified air supplied to the fuel cell stack is reduced, and the efficiency of power generation of the fuel cell is degraded.

DISCLOSURE

Technical Problem

An object of the present invention is to provide a gasket assembly capable of preventing problems caused by limitations and disadvantages of the related art described above, being manufactured with improved productivity, and dramatically reducing a maintenance cost, and a fuel cell membrane humidifier including the same.

Technical Solution

A gasket assembly according to the embodiment of the present invention is a gasket assembly for a fuel cell membrane humidifier including a mid-case, a cap fastened to the mid-case, and at least one cartridge disposed inside the mid-case and accommodating a plurality of hollow fiber membranes, the gasket assembly including: a sub-case formed in a shape surrounding an end of the cartridge and including a first hole into which the end of the cartridge is inserted; and a gasket including a body member having a second hole into which the sub-case is inserted, a packing portion including a protrusion member formed at one end of the body member and coming into contact with an outer circumferential surface of the sub-case inserted into the second hole to prevent a fluid in the mid-case from flowing toward the cap, and an edge portion formed at the other end of the body member and formed in a space formed by a groove formed at an end of the mid-case and an end of the cap.

In the gasket assembly according to the embodiment of the present invention, an adhesive may be applied to an inner circumferential surface of the sub-case such that the sub-case is coupled to the end of the cartridge.

In the gasket assembly according to the embodiment of the present invention, the sub-case may be formed of a material having a hardness higher than a material constituting the potting portion.

In the gasket assembly according to the embodiment of the present invention, the body member may include a lower body member formed to protrude downward, and an upper body member formed in a planar shape toward the cap.

In the gasket assembly according to the embodiment of the present invention, the body member may include two or more second holes into which two or more sub-cases can be inserted, and two or more protrusion members may be included and formed in contact with outer circumferential surfaces of the two or more sub-cases.

In the gasket assembly according to the embodiment of the present invention, the protrusion member may press and come into contact with the outer circumferential surface of the sub-case according to an elastic force to make a space on the mid-case side and a space on the cap side airtight.

In the gasket assembly according to the embodiment of the present invention, the edge portion may include edge wings protruding in both directions, and the edge wings may be interposed with the groove formed at the end of the mid-case filled with the edge wings to seal the inside and outside of the mid-case, the mid-case, and the cap.

In the gasket assembly according to the embodiment of the present invention, each of the packing portion and the edge portion may have a first hardness of 20 to 70 Shore A, and the gasket assembly may further include a reinforcing member formed to be inserted into at least a portion of the packing portion and at least a portion of the edge portion, the reinforcing member having a second hardness higher than the first hardness.

A fuel cell membrane humidifier according to an embodiment of the present invention includes a mid-case, a cap fastened to the mid-case, at least one cartridge disposed inside the mid-case and accommodating a plurality of hollow fiber membranes, and a gasket assembly airtightly coupled to at least one end of the humidification module through mechanical assembly so that the cap is able to be in fluid communication only with the hollow fiber membranes. The gasket assembly includes a sub-case formed in a shape surrounding an end of the cartridge and including a first hole into which the end of the cartridge is inserted; and a gasket including a body member having a second hole into which the sub-case is inserted, a packing portion including a protrusion member formed at one end of the body member and coming into contact with an outer circumferential surface of the sub-case inserted into the second hole to prevent a fluid in the mid-case from flowing toward the cap, and an edge portion formed at the other end of the body member and formed in a space formed by a groove formed at an end of the mid-case and an end of the cap.

In the fuel cell membrane humidifier according to the embodiment of the present invention, an adhesive may be applied to an inner circumferential surface of the sub-case such that the sub-case is coupled to the end of the cartridge.

In the fuel cell membrane humidifier according to the embodiment of the present invention, the sub-case may be formed of a material having a hardness higher than a material constituting the potting portion.

In the fuel cell membrane humidifier according to the embodiment of the present invention, the body member may include a lower body member formed to protrude downward, and an upper body member formed in a planar shape toward the cap.

In the fuel cell membrane humidifier according to the embodiment of the present invention, the body member may include two or more second holes into which two or more sub-cases can be inserted, and two or more protrusion members may be included and formed in contact with outer circumferential surfaces of the two or more sub-cases.

In the fuel cell membrane humidifier according to the embodiment of the present invention, the protrusion member may press and come into contact with the outer circumferential surface of the sub-case according to an elastic force to make a space on the mid-case side and a space on the cap side airtight.

In the fuel cell membrane humidifier according to the embodiment of the present invention, the edge portion may include edge wings protruding in both directions, and the edge wings may be interposed with the groove formed at the end of the mid-case filled with the edge wings to seal the inside and outside of the mid-case, the mid-case, and the cap.

In the fuel cell membrane humidifier according to the embodiment of the present invention, each of the packing portion and the edge portion may have a first hardness of 20 to 70 Shore A, and the fuel cell membrane humidifier may further include a reinforcing member formed to be inserted into at least a portion of the packing portion and at least a portion of the edge portion, the reinforcing member having a second hardness higher than the first hardness.

In the fuel cell membrane humidifier according to the embodiment of the present invention, the cartridge may include an inner case having an opening formed at an end thereof and accommodating the plurality of hollow fiber membranes; and a potting portion to which ends of the plurality of hollow fiber membranes are fixed, the potting portion closing the opening of the inner case.

In the fuel cell membrane humidifier according to the embodiment of the present invention, at least a portion of the potting portion may be located outside the inner case and exposed, and the sub-case may be coupled to the exposed potting portion.

Other specific matters of implementation examples according to various aspects of the present invention are included in the detailed description below.

Advantageous Effects

According to the present invention, since air leakage between the mid-case and the cap is prevented through mechanical assembly of the gasket assembly, it is possible to omit a casting process (that is, a process of injecting a liquid polymer into a mold and curing the liquid polymer) and an additional sealing process (that is, a process of applying and curing a sealant) of the related art, for example. Therefore, according to the present invention, it is possible to dramatically improve the productivity by reducing a production process time of the fuel cell membrane humidifier while preventing the air leakage between the mid-case and the cap.

Further, the gasket assembly of the present invention for preventing air leakage between the mid-case and the cap is mounted on the humidification module through mechanical assembly, and thus, when an abnormality occurs in a specific portion of the humidification module, it is possible to simply mechanically separate the gasket assembly, and then, repair or replace only the portion. Therefore, according to the present invention, it is possible to greatly reduce a maintenance cost of the fuel cell membrane humidifier.

Further, since the sub-case prevents the protrusion member from coming into direct contact with the potting portion, it is possible to prevent the protrusion member from deforming and damaging the potting portion due to a compressive force of the gasket assembly.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are used for the purpose of describing specific embodiments only and are not intended to limit the present invention. The singular expressions "a," "an" and "the" include the plural expressions, unless the context clearly indicates otherwise. It will be understood that the terms "include" or "have" herein specify the presence of features, numbers, steps, operations, components, parts or combinations thereof described herein, but do not preclude the presence or addition of one or more other features, numbers, steps, operations, components, parts or combinations thereof. Hereinafter, a fuel cell membrane humidifier according to embodiments of the present invention will be described with reference to the drawings.

Figure 1:
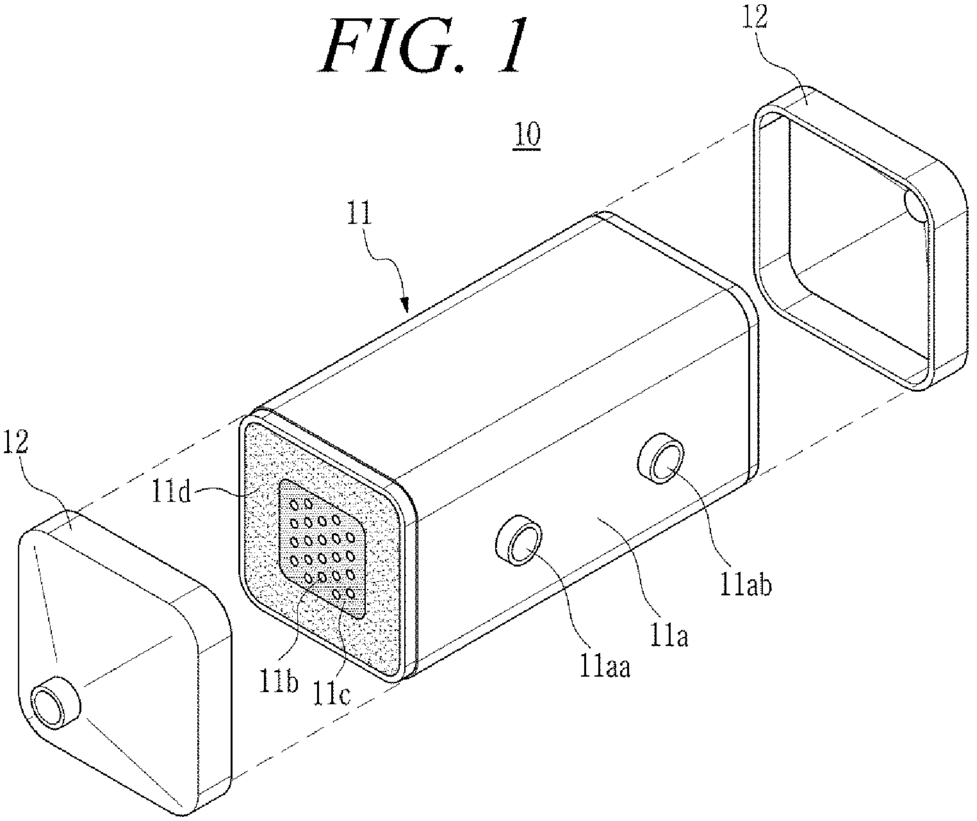
FIG. 1 is an exploded perspective view illustrating a fuel cell membrane humidifier according to the related art.
Figure 2:
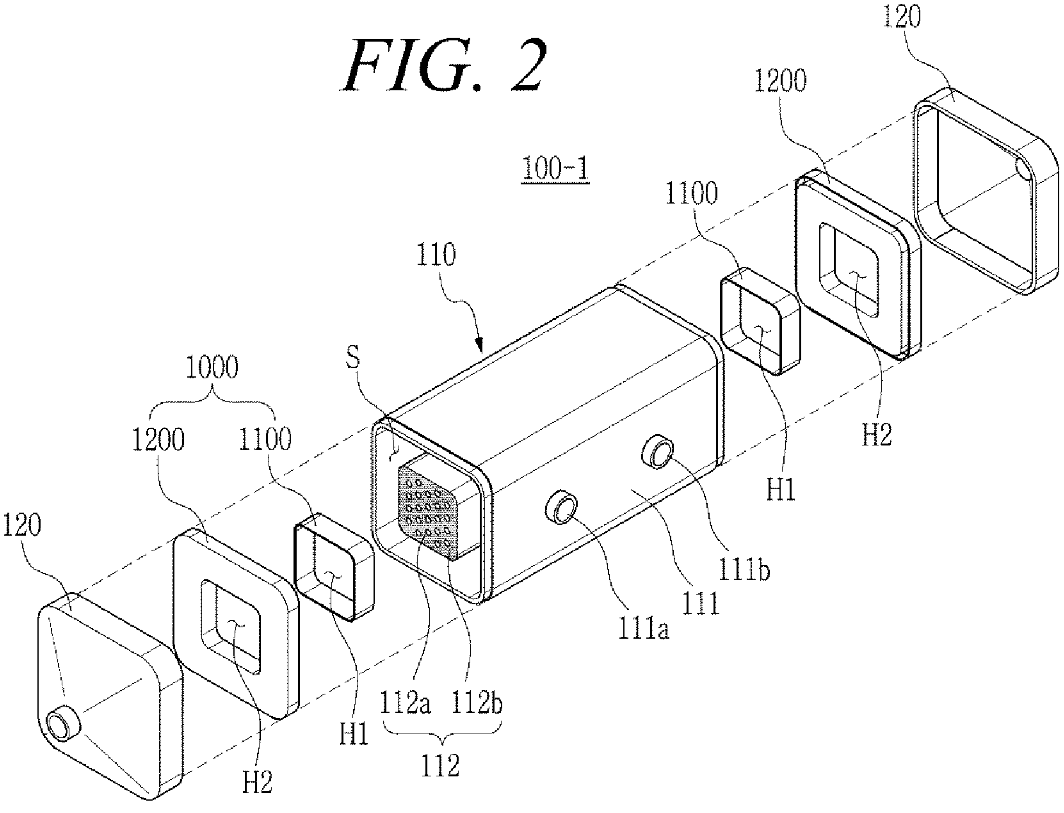
FIG. 2 is an exploded perspective view illustrating a fuel cell membrane humidifier according to a first embodiment of the present invention.
Figure 3:
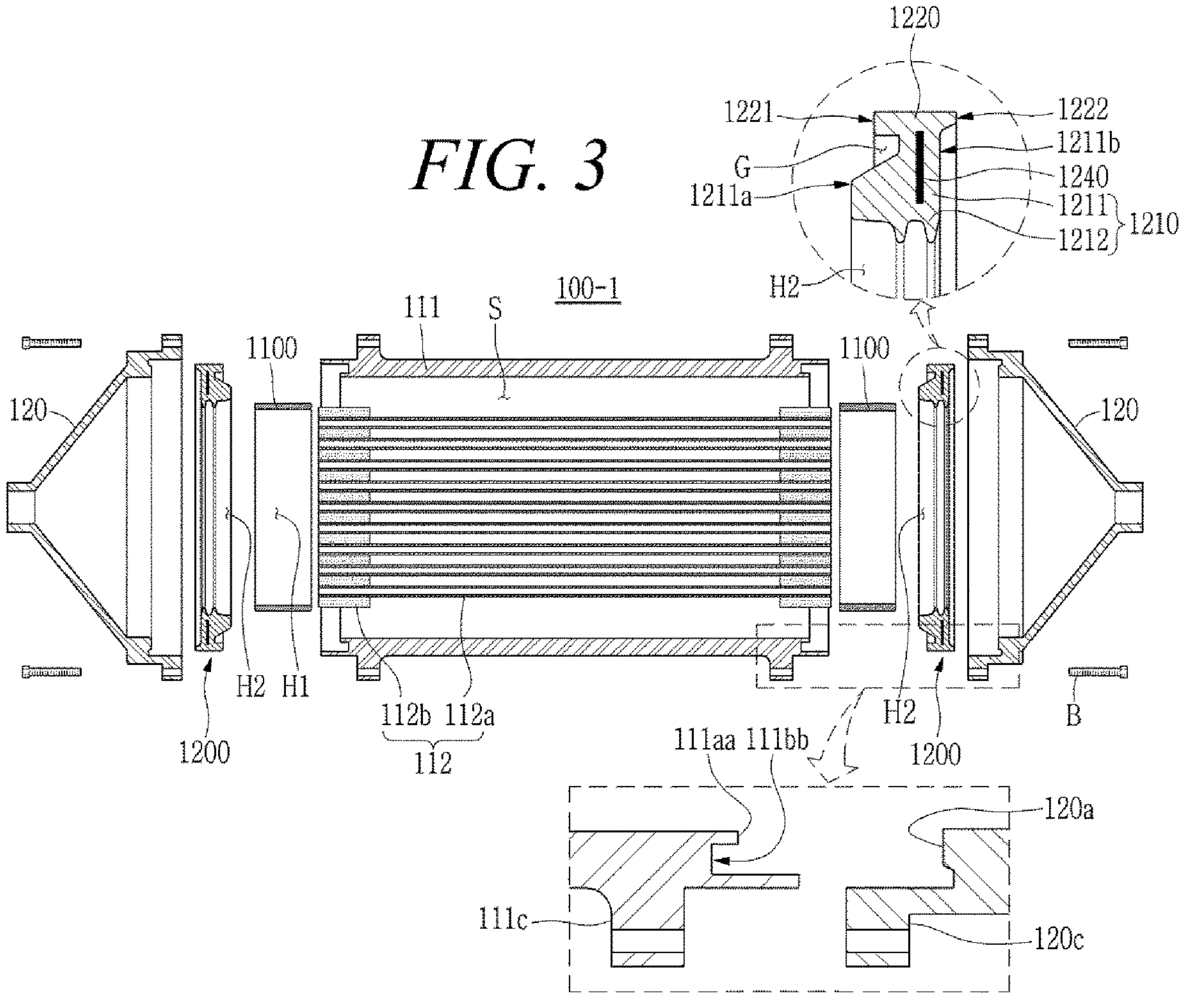
FIG. 3 is an exploded cross-sectional view illustrating the fuel cell membrane humidifier according to the first embodiment of the present invention.
Figure 4:
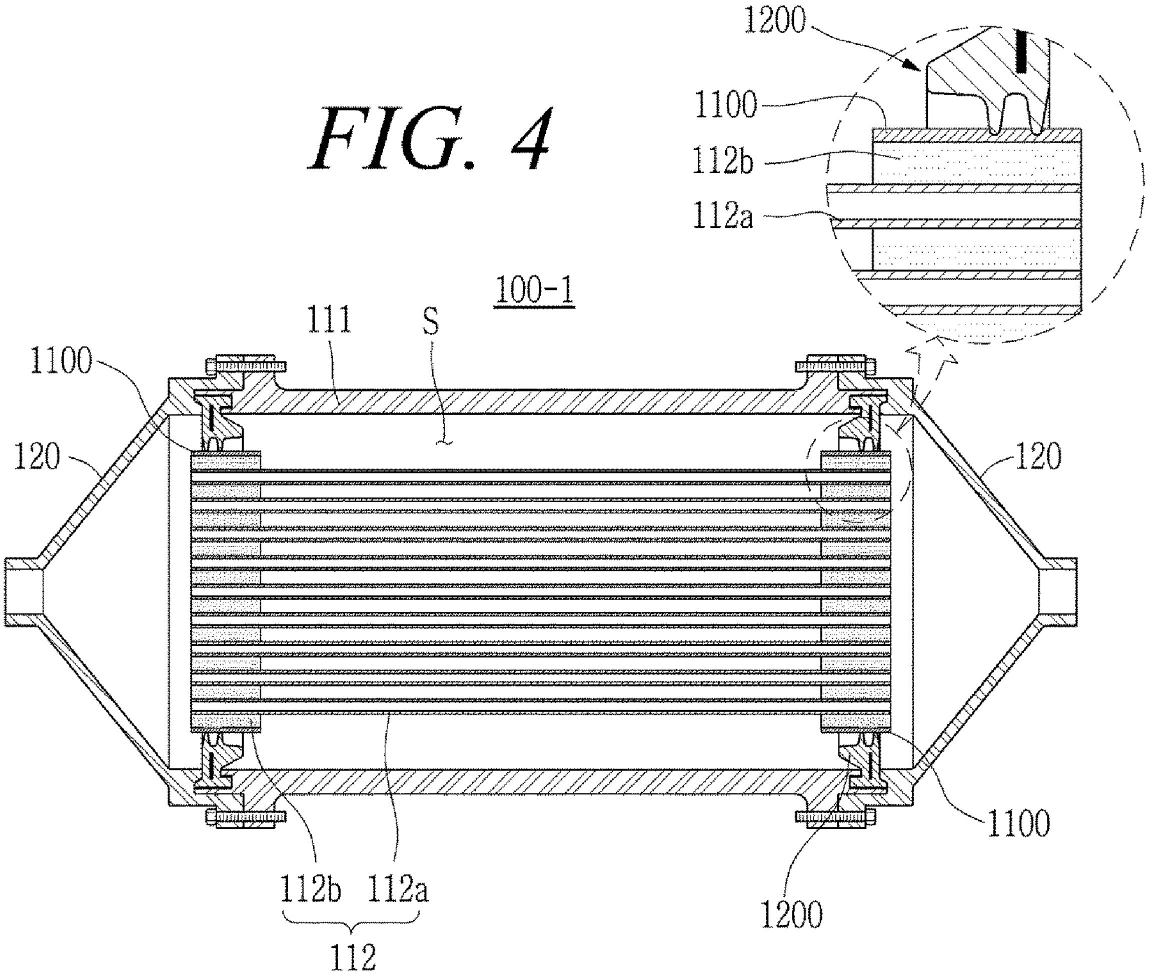
FIG. 4 is a cross-sectional view of the fuel cell membrane humidifier according to the first embodiment of the present invention.

FIG. 2 is an exploded perspective view illustrating a fuel cell membrane humidifier according to a first embodiment of the present invention, FIG. 3 is an exploded cross-sectional view illustrating the fuel cell membrane humidifier according to the first embodiment of the present invention, and FIG. 4 is a cross-sectional view of the fuel cell membrane humidifier according to the first embodiment of the present invention.

Referring to FIG. 2, the fuel cell membrane humidifier 100-1 according to the first embodiment of the present invention includes a humidification module 110 that humidifies air supplied from the outside with moisture in an off-gas discharged from a fuel cell stack. Both ends of the humidification module 110 are coupled to caps 120.

One of the caps 120 supplies the air supplied from the outside to the humidification module 110, and the other supplies the air humidified by the humidification module 110 to the fuel cell stack.

The humidification module 110 is a device in which moisture exchange between the air supplied from the outside and an off-gas occurs, and may include a mid-case 111 having an off-gas inlet 111*aa* and an off-gas outlet 111*b*, and at least one cartridge 112 disposed in the mid-case 111.

The mid-case 111 and the cap 120 may be independently formed of hard plastic or metal, and may have a cross section in a width direction having a circular or polygonal shape. The "circular shape" includes an oval shape, and the "polygonal shape" includes a polygonal shape with rounded corners. Examples of the hard plastic may include polycarbonate, polyamide (PA), polyphthalamide (PPA), and polypropylene (PP).

The cartridge 112 may include a plurality of hollow fiber membranes 112*a* and a potting portion 112*b* that fixes the hollow fiber membranes 112*a* to each other. Ends of the hollow fiber membranes 112*a* may be fixed to the potting portion 112*b*.

The hollow fiber membranes 112*a* may include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these, and the potting portions 112*b* may be formed by curing a liquid resin such as a liquid polyurethane resin through a casting scheme such as deep potting or centrifugal potting.

The gas supplied from the outside flows along hollows of the hollow fiber membranes 112*a*. The off-gas flowing into the mid-case 111 through the off-gas inlet 111*a* comes into contact with outer surfaces of the hollow fiber membranes 112*a* and then is discharged from the mid-case 111 through the off-gas outlet 111*b*. When the off-gas comes into contact with the outer surfaces of the hollow fiber membranes 112*a*, moisture contained in the off-gas permeates the hollow fiber membranes 112*a* to humidify the air flowing along the hollows of the hollow fiber membranes 112*a*.

The cap 120 is in fluid communication only with the hollows of the hollow fiber membranes 112*a* and should be completely blocked from an inner space S of the mid-case 111. Otherwise, air leakage occurs due to a pressure difference, an amount of humidified air supplied to the fuel cell stack is reduced, and the efficiency of power generation of the fuel cell is degraded.

In order to solve this problem, the fuel cell membrane humidifier 100 of the present invention further includes a gasket assembly 1000 that is airtightly coupled to each end of the humidification module 110 through mechanical assembly.

According to the present invention, since air leakage between the mid-case 111 and the cap 120 is prevented through mechanical assembly of the gasket assembly 1000, it is possible to omit a casting process (that is, a process of injecting a liquid resin into a mold and curing the liquid resin) and an additional sealing process (that is, a process of applying and curing a sealant) of the related art, for example. Therefore, according to the present invention, it is possible to dramatically improve the productivity by reducing a production process time of the fuel cell membrane humidifier 100 while preventing air leakage between the mid-case 111 and the cap 120.

Further, the gasket assembly 1000 of the present invention is mounted on the humidification module 110 through mechanical assembly, and thus, when an abnormality occurs in a specific portion (for example, the cartridge 112) of the humidification module 110, it is possible to simply mechanically separate the sub-case 1100 and the gasket assembly 1000 from the humidification module 110 and then, repair or replace only the portion. Therefore, according to the present invention, it is possible to greatly reduce a maintenance cost of the fuel cell membrane humidifier 100.

Referring to FIGS. 3 and 4, the gasket assembly 1000 includes a sub-case 1100 and a gasket 1200. The gasket 1200 includes a packing portion 1210 and an edge portion 1220. The packing portion 1210 and the edge portion 1220 may be formed of an elastic material (for example, silicone or rubber) having a first hardness of 20 to 70 Shore A and, preferably, 30 to 60 Shore A.

The sub-case 1100 is formed in a shape surrounding an end (for example, the potting portion 112*b*) of the cartridge 112. The sub-case 1100 may be formed of a material having a hardness higher than a material constituting the potting portion 112*b*. The sub-case 1100 includes a first hole H1 into which the potting portion 112*b* of the cartridge 112 is inserted. The potting portion 112*b* of the cartridge 112 may be inserted into and fixed to the first hole H1 of the sub-case 1100. An adhesive such as a primer may be applied to an inner circumferential surface of the sub-case 1100 so that the sub-case 1100 can be coupled to the potting portion 112*b*. Alternatively, an inner case 112*c* (see FIG. 5) having the hollow fiber membrane 112*a* disposed therein may be inserting into and fixed to the first hole H1 of the sub-case 1100, and then, the potting portion 112*b* may be formed.

The packing portion 1210 includes a second hole H2 into which the sub-case 1100 is inserted and is interposed between the mid-case 111 and the sub-case 1100. The packing portion 1210 includes a body member 1211 and a protrusion member 1212.

The body member 1211 includes the second hole H2 into which the sub-case 1100 is inserted, and the second hole H2 is formed in a shape corresponding to that of the sub-case 1100. A lower body member 1211*a* formed to protrude downward from the body member 1211 may have a cross section formed in a polygonal shape (for example, a trapezoidal shape), and an upper body member 1211*b* formed toward the cap 120 may be formed in a planar shape. Of course, the upper body member 1211*b* is not limited to the planar shape and may be formed in any of various shapes such as a curved surface and an inclined surface. A groove G into which an end 111*a* of the mid-case 111 is fitted is formed between the lower body member 1211*a* and the edge portion 1220.

The protrusion member 1212 is formed at one end of the body member 1211 to come into contact with an outer circumferential surface of the sub-case 1100. The protrusion member 1212 may be at least one annular protrusion protruding from the one end of the body member 1211. In the drawing, two protrusion members 1212 are illustrated. The protrusion member 1212 presses and comes into contact with the sub-case 1100 according to an elastic force to make a space of the mid-case 111 and a space of the cap 120 airtight. Therefore, the protrusion member 1212 can prevent a fluid in the mid-case 111 from flowing into the space formed on the cap 120 side. Further, since the protrusion member 1212 has elasticity, the protrusion member 1212 can perform a vibration dampening function, and thus, prevent the membrane humidifier 100 from being damaged by vibration. In this case, since the sub-case 1100 prevents the protrusion member 1212 from coming into direct contact with the potting portion 112*b*, it is possible to prevent the protrusion member 1212 from deforming and damaging the potting portion 112_b_ due to a compressive force of the gasket 1200.

The edge portion 1220 is formed at the other end of the body member 1211. The edge portion 1220 may be interposed in a space formed by a groove 111_bb_ formed at an end of the mid-case and an end 120_a_ of the cap. The edge portion 1220 may include edge wings 1221 and 1222 protruding in both directions. The edge wings 1221 and 1222 may be formed in a longitudinal direction of the humidification module 110.

When assembling is performed, the edge wings 1221 and 1222 are inserted into the groove 111_bb_ at the end of the mid-case, the edge wing 1222 is pressed by the end 120_a_ of the cap, and then, assembly is performed by fastening using a fastening means such as a bolt B. In this case, since the edge wings 1221 and 1222 are made of an elastic material, the edge wings 1221 and 1222 may be interposed with a space of the groove 111_bb_ at the end of the mid-case partially filled with the edge wings 1221 and 1222. Fastening fragments 111_c_ and 120_c_ having fastening holes for fastening bolts may be formed on side surfaces of ends of the mid-case 111 and the cap 120. The edge wings 1221 and 1222 may make the groove 111_bb_ at the end of the mid-case airtight to seal the inside and outside of the mid-case 111, and the mid-case 111, and the cap 120.

Further, the gasket 1200 may further include a reinforcing member 1240. The reinforcing member 1240 may have a second hardness higher than the first hardness. For example, the reinforcing member 1240 may be formed of metal, a thermoplastic or thermosetting resin, or the like. The reinforcing member 1240 may be formed to be inserted into the gasket 1200 by being manufactured after a metal plate is inserted into a mold at the time of molding of the gasket 1200. The reinforcing member 1240 may be formed to be inserted into at least a portion of the packing portion 1210 and at least a portion of the edge portion 1220. The reinforcing member 1240 may be formed at a portion of the gasket assembly 1000 that is vulnerable to deformation (a portion in which the groove G is formed). The reinforcing member 1240 having a hardness higher than the packing portion 1210 and the edge portion 1220 can prevent the body member 1211 from being deformed when the gasket assembly 1000 is mechanically assembled to the humidification module 110 or while the membrane humidifier is operating, to block air leakage more reliably.

Figure 5:
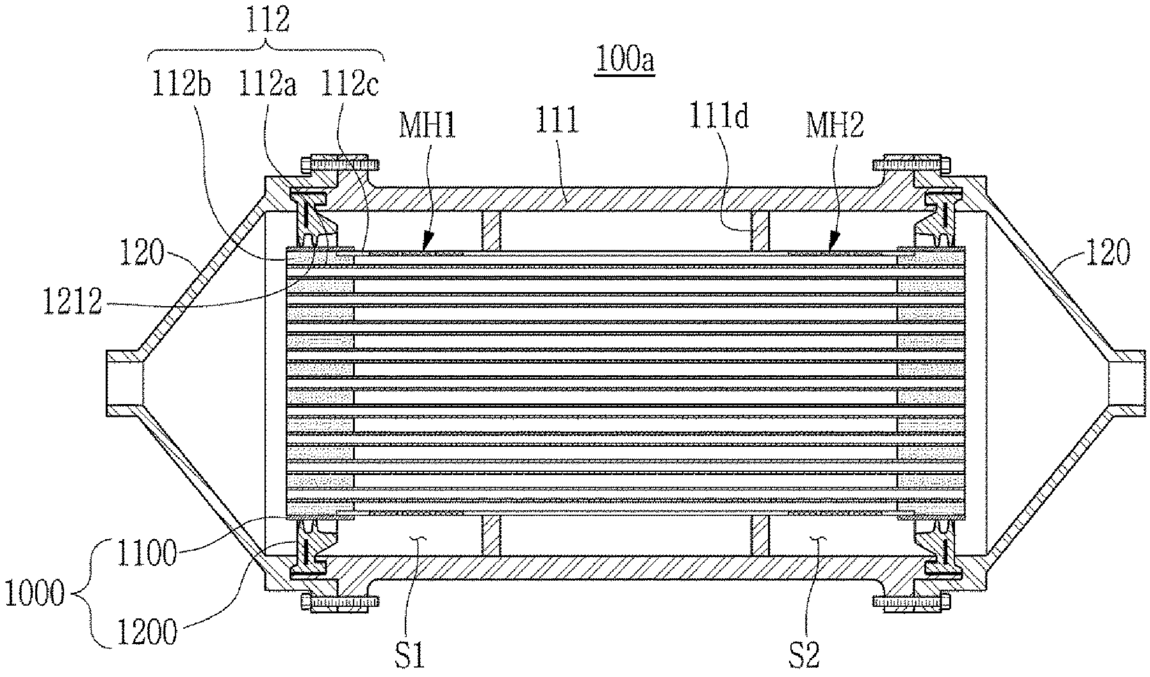
FIG. 5 is a cross-sectional view illustrating a modification example of the fuel cell membrane humidifier according to the first embodiment of the present invention.

Next, a modification example of the fuel cell membrane humidifier according to the first embodiment of the present invention will be described with reference to FIG. 5. FIG. 5 is a cross-sectional view illustrating the modification example of the fuel cell membrane humidifier according to the first embodiment of the present invention.

Referring to FIG. 5, the modification example 100_a_ of the fuel cell membrane humidifier according to the first embodiment of the present invention is substantially the same as the fuel cell membrane humidifier 100-1 according to the first embodiment described above except that (i) an inner space of a mid-case 111 is partitioned into a first space S1 and a second space S2 by partitions 111_d_, and (ii) a cartridge 112 further includes an inner case 112_c_.

The inner case 112_c_ has an opening at each end, and hollow fiber membranes 112_a_ are accommodated in the opening. Potting portions 112_b_ to which ends of the hollow fiber membranes 112_a_ are potted close the openings of the inner case 112_c_.

As illustrated in FIG. 5, at least a portion of the potting portion 112_b_ may be located outside the inner case 112_c_ and exposed, and a sub-case 1100 may be coupled to the exposed potting portion 112_b_.

The inner case 112_c_ includes a plurality of holes (hereinafter referred to as 'first mesh holes') MH1 arranged in a mesh form for fluid communication with the first space S1, and a plurality of holes (hereinafter referred to as 'second mesh holes') MH2 arranged in a mesh form for fluid communication with the second space S2.

An off-gas flowing into the first space S1 of the mid-case 111 through an off-gas inlet 111_a_ flows into the inner case 112_c_ through the first mesh holes MH1 and comes into contact with outer surfaces of the hollow fiber membranes 112_a_. Subsequently, the off-gas deprived of moisture exits to the second space S2 through the second mesh holes MH2, and then, is discharged from the mid-case 111 through an off-gas outlet 111_b_.

Such a cartridge 112 including the inner case 112_c_ has an advantage of being able to be easily assembled to the mid-case 111 and easily replaced.

Figure 6:
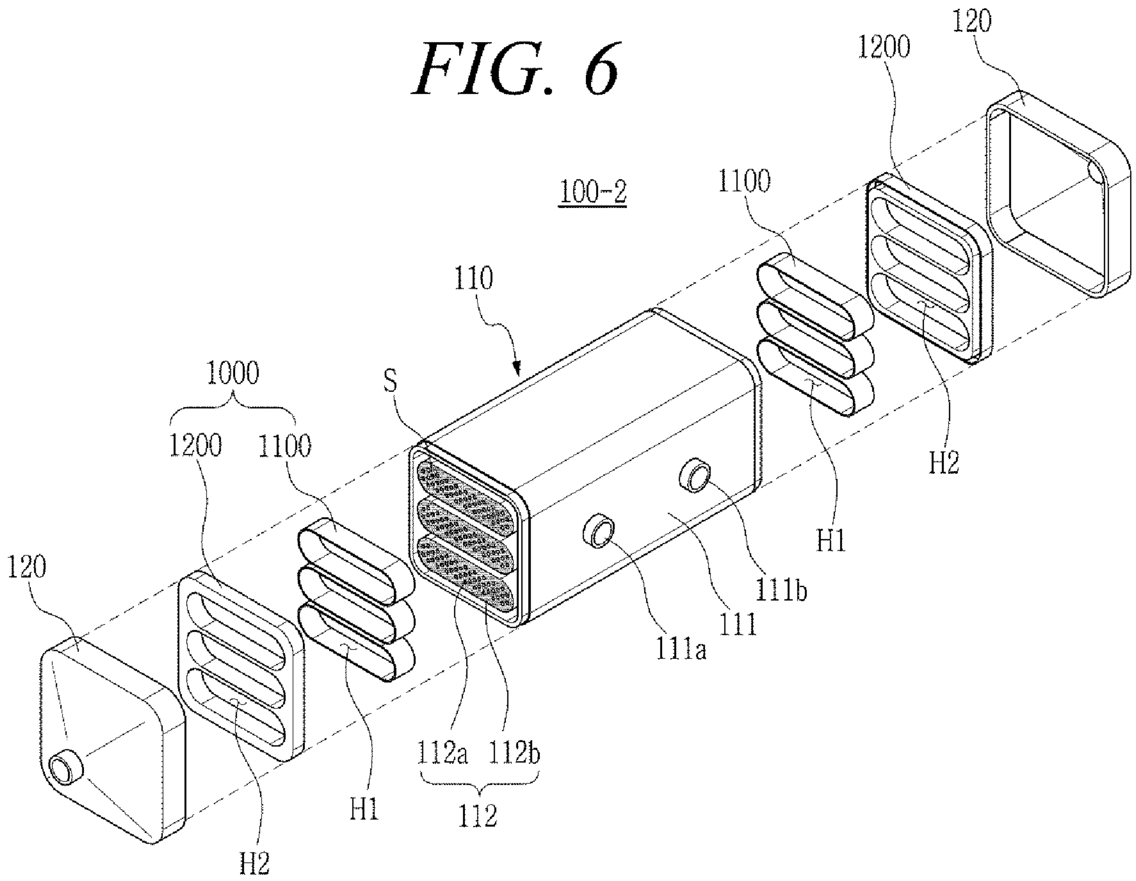
FIG. 6 is an exploded perspective view illustrating a fuel cell membrane humidifier according to a second embodiment of the present invention.

Next, a fuel cell membrane humidifier according to a second embodiment of the present invention will be described with reference to FIGS. 6 to 8. FIG. 6 is an exploded perspective view illustrating the fuel cell membrane humidifier according to the second embodiment of the present invention, FIG. 7 is an exploded cross-sectional view illustrating the fuel cell membrane humidifier according to the second embodiment of the present invention, and FIG. 8 is a cross-sectional view of the fuel cell membrane humidifier according to the second embodiment of the present invention.

Figure 7:
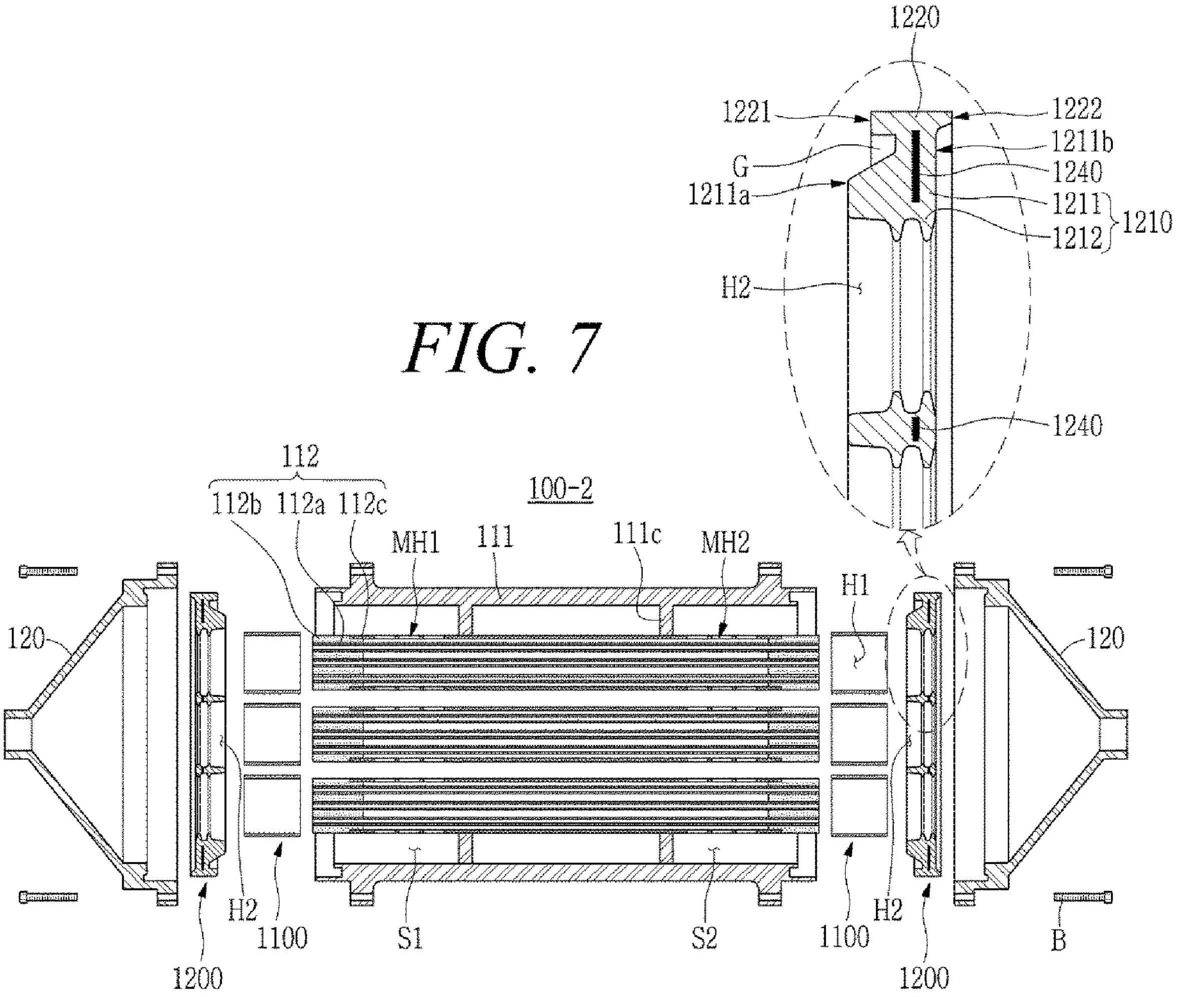
FIG. 7 is an exploded cross-sectional view illustrating the fuel cell membrane humidifier according to the second embodiment of the present invention.
Figure 8:
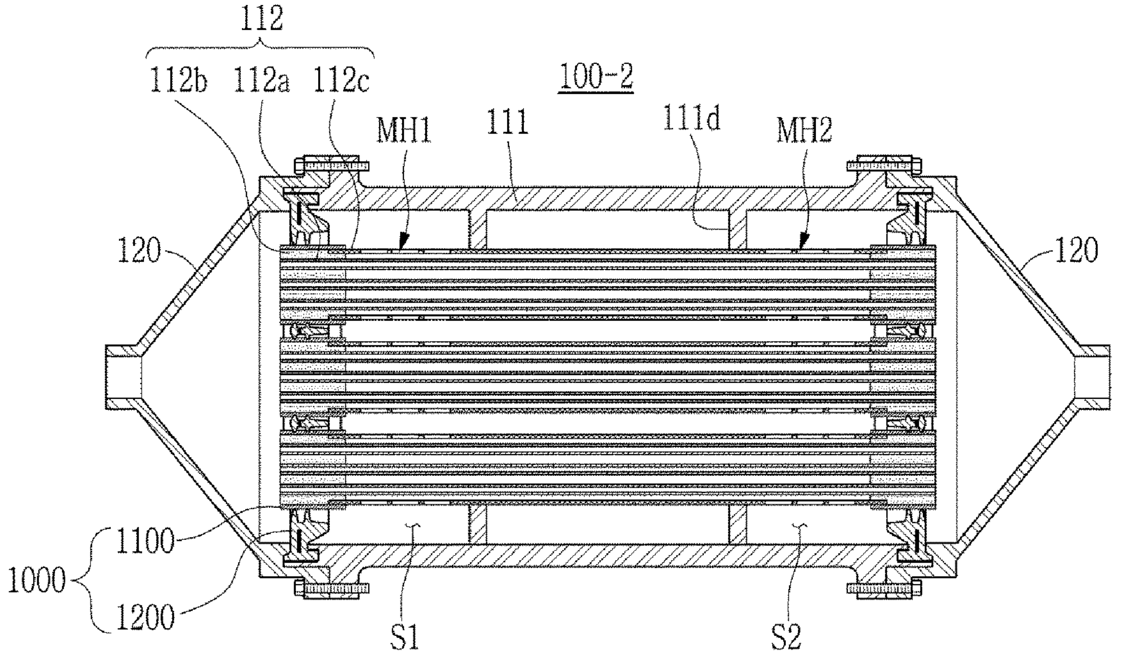
FIG. 8 is a cross-sectional view illustrating the fuel cell membrane humidifier according to the second embodiment of the present invention.

As illustrated in FIGS. 6 to 8, the fuel cell membrane humidifier 100-2 according to the second embodiment of the present invention is substantially the same as the modification example 100_a_ of the fuel cell membrane humidifier according to the first embodiment described above except that (i) a humidification module 110 includes two or more cartridges 112, (ii) a plurality of sub-cases 1100 formed to surround potting portions 112_b_ of the two or more cartridges 112 are included, (iii) a body member 1211 of the packing portion 1210 includes two or more holes H2 into which the plurality of sub-cases 1100 are inserted, and (iv) two or more protrusion members 1212 formed at one end of the body member 1211 to come into contact with the sub-case 1100 are included.

A plurality of cartridges 112 each including an inner case 112_c_ are mounted in a mid-case 111, making it possible to distribute an off-gas to all hollow fiber membranes 112_a_ present in the mid-case 111, and to selectively replace only the specific cartridge 112 in which a problem occurs, thereby further reducing a maintenance cost of the fuel cell membrane humidifier.

Figure 9A:
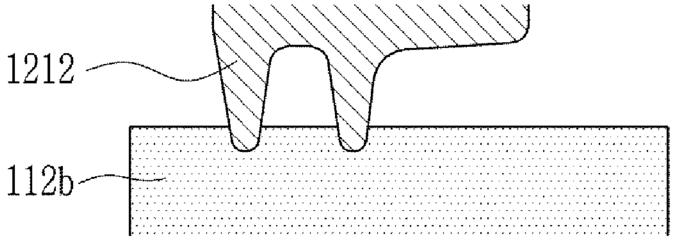
FIGS. 9A and 9B and 10 are views illustrating effects of the fuel cell membrane humidifiers according to the embodiments of the present invention.
Figure 9B:
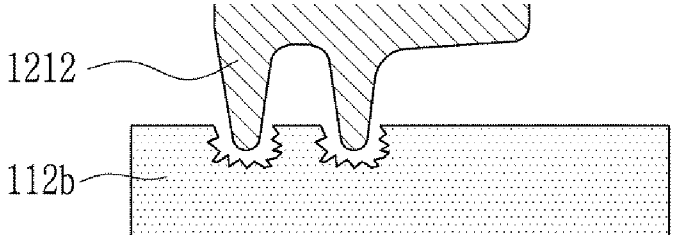
Figure 10:
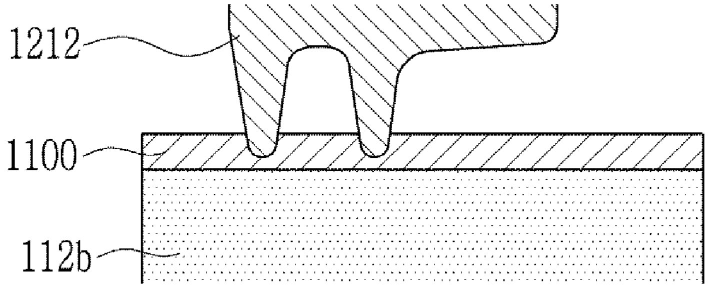

Next, effects of the fuel cell membrane humidifiers according to the embodiments of the present invention will be described with reference to FIGS. 9A, 9B, and 10. FIGS. 9A, 9B, and 10 are views illustrating the effects of the fuel cell membrane humidifiers according to the embodiments of the present invention.

First, FIGS. 9A and 9B are view schematically illustrating a state in which the protrusion members 1212 directly press the potting portion 112_b_ formed at the end of the cartridge 112 in a state in which there is no sub-case 1100, to make the space of the mid-case 111 and the space of the cap 120 airtight.

As illustrated in FIG. 9A, the protrusion members 1212 directly press and come into contact with the potting portion 112*b* due to a compressive force of the gasket 1200, thereby making the space of the mid-case 111 and the space of the cap 120 airtight. However, when the fuel cell membrane humidifier is repeatedly used for a long time, portions of the potting portion 112*b* coming into contact with the protrusion members 1212 according to the compressive force of the gasket 1200 are deformed and damaged, as illustrated in FIG. 9B. When the fuel cell membrane humidifier is continuously used in this state, the damage of the potting portion 112*b* is accelerated, making it difficult for the potting portion 112*b* to perform an original function (division of a flow space).

Meanwhile, in the present invention, since the protrusion members 1212 are prevented from coming into direct contact with the potting portion 112*b* by the sub-case 1100 as illustrated in FIG. 10, it is possible to prevent the protrusion members 1212 from deforming and damaging the potting portion 112*b* according to the compression force of the gasket 1200.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

DETAILED DESCRIPTION OF MAIN ELEMENTS

100 (100-1, 100-2, 100*a*): fuel cell membrane humidifier
110: humidification module 111: mid-case
112: cartridge 112*b*: potting portion
112*c*: inner case 1000: gasket assembly
1100: sub-case 1200: gasket

The invention claimed is:

1. A fuel cell membrane humidifier comprising:
a mid-case,
a cap fastened to the mid-case,
at least one cartridge disposed inside the mid-case and accommodating a plurality of hollow fiber membranes, and
a gasket assembly airtightly coupled to at least one end of a humidification module through mechanical assembly so that the cap is able to be in fluid communication only with the hollow fiber membranes,
wherein the gasket assembly includes
a sub-case formed in a shape surrounding an end of the cartridge and including a first hole into which the end of the cartridge is inserted; and
a gasket including a body member having a second hole into which the sub-case is inserted, a packing portion including a protrusion member formed at one end of the body member and coming into contact with an outer circumferential surface of the sub-case inserted into the second hole to prevent a fluid in the mid-case from flowing toward the cap, and an edge portion formed at the other end of the body member and formed in a space formed by a groove formed at an end of the mid-case and an end of the cap,
wherein the cartridge includes
an inner case having an opening formed at an end thereof and accommodating the plurality of hollow fiber membranes; and
a potting portion to which ends of the plurality of hollow fiber membranes are fixed, the potting portion closing the opening of the inner case,
wherein at least a portion of the potting portion is located outside the inner case and exposed, and the sub-case is coupled to the exposed potting portion,
wherein the protrusion member presses and comes into contact with the outer circumferential surface of the sub-case according to an elastic force to make a space on the mid-case side and a space on the cap side airtight,
wherein the protrusion member is made of annular protrusions, and the packing portion includes two or more of the protrusion members,
wherein the sub-case inserted into the second hole prevents deformation of the potting portion by the protrusion member.

2. The fuel cell membrane humidifier of claim 1, wherein an adhesive is applied to an inner circumferential surface of the sub-case such that the sub-case is coupled to the end of the cartridge.

3. The fuel cell membrane humidifier of claim 1, wherein the sub-case is formed of a material having a hardness higher than a material constituting the potting portion formed at the end of the cartridge.

4. The fuel cell membrane humidifier of claim 1, wherein the body member includes a lower body member formed to protrude downward, and an upper body member formed in a planar shape toward the cap.

5. The fuel cell membrane humidifier of claim 1, wherein the body member includes two or more second holes into which two or more sub-cases can be inserted, and two or more protrusion members are included and formed in contact with outer circumferential surfaces of the two or more sub-cases.

6. The fuel cell membrane humidifier of claim 1,
wherein the edge portion includes edge wings protruding in both directions, and
the edge wings are interposed with the groove formed at the end of the mid-case filled with the edge wings to seal the inside and outside of the mid-case, the mid-case, and the cap.

7. The fuel cell membrane humidifier of claim 1,
wherein each of the packing portion and the edge portion has a first hardness of 20 to 70 Shore A, and
the fuel cell membrane humidifier further comprises a reinforcing member formed to be inserted into at least a portion of the packing portion and at least a portion of the edge portion, the reinforcing member having a second hardness higher than the first hardness.

* * * * *